Oct. 1, 1968   R. J. KIDDER   3,404,335
APPARATUS FOR MEASURING ELECTRICAL CONDUCTIVITY OF
A CONDUCTING MEDIUM CAPABLE OF
FLOWING IN A CONDUIT
Filed July 26, 1965   3 Sheets-Sheet 1
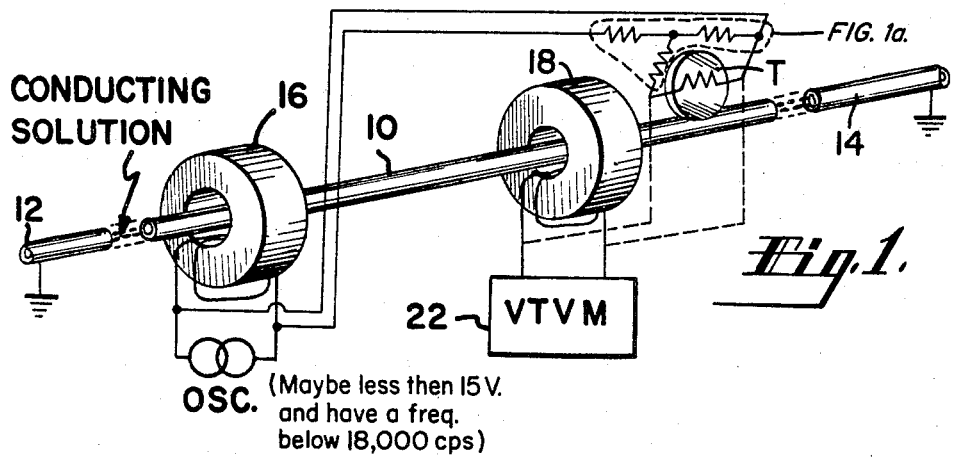
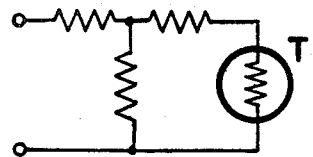 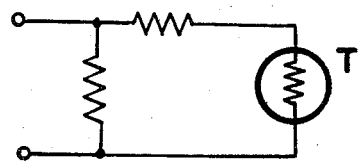
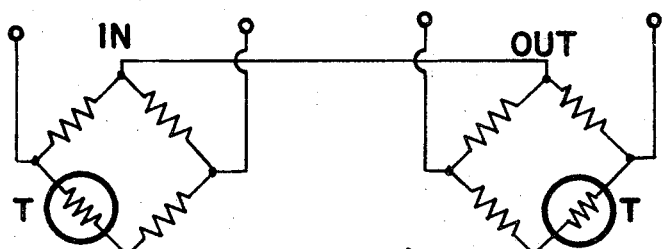
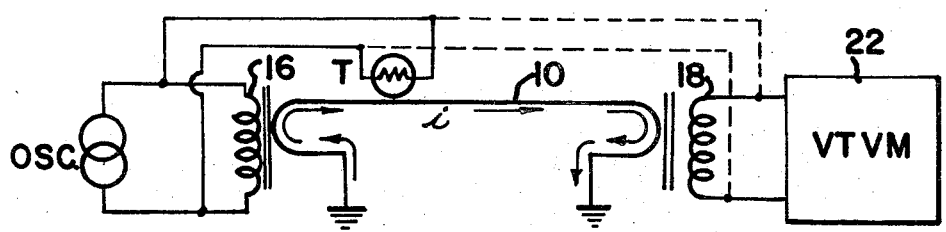
INVENTOR
RICHARD J. KIDDER
BY Charles H. Brown
Attorney Oct. 1, 1968 R. J. KIDDER 3,404,335
APPARATUS FOR MEASURING ELECTRICAL CONDUCTIVITY OF
A CONDUCTING MEDIUM CAPABLE OF
FLOWING IN A CONDUIT
Filed July 26, 1965 3 Sheets-Sheet 2
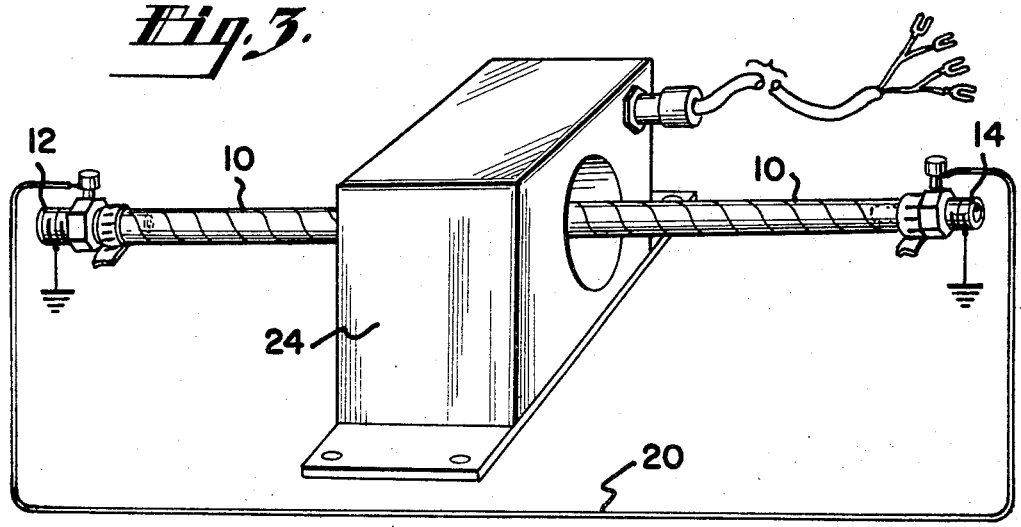
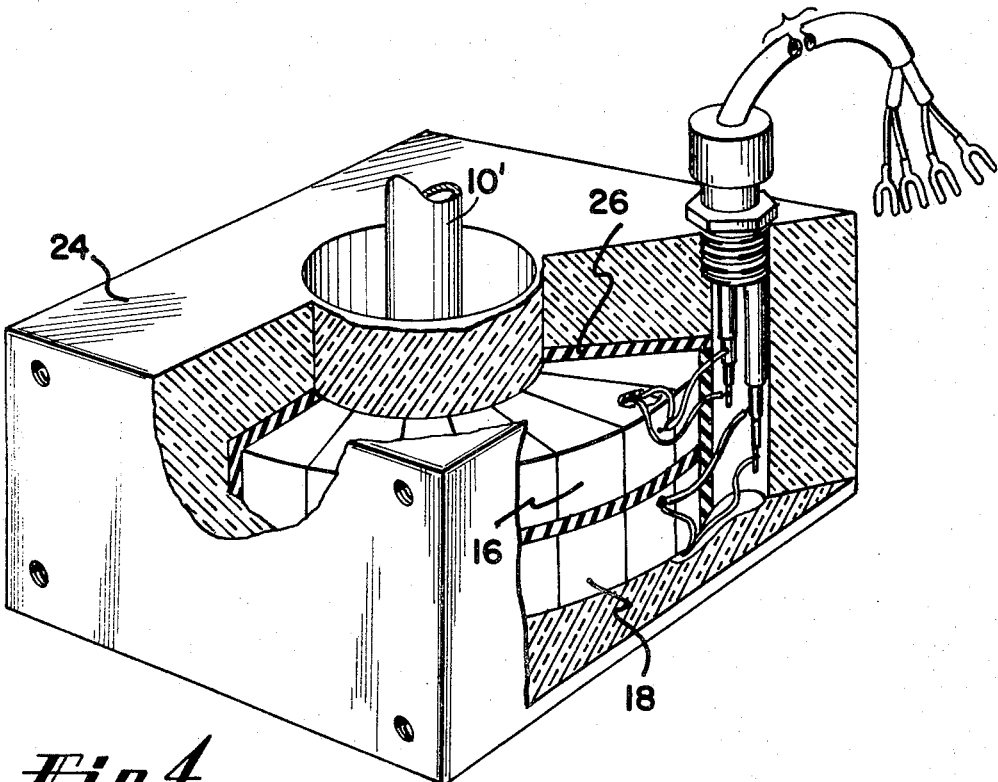
INVENTOR
RICHARD J. KIDDER
BY Charles H. Brown
Attorney Oct. 1, 1968  R. J. KIDDER  3,404,335
APPARATUS FOR MEASURING ELECTRICAL CONDUCTIVITY OF
A CONDUCTING MEDIUM CAPABLE OF
FLOWING IN A CONDUIT
Filed July 26, 1965  3 Sheets-Sheet 3
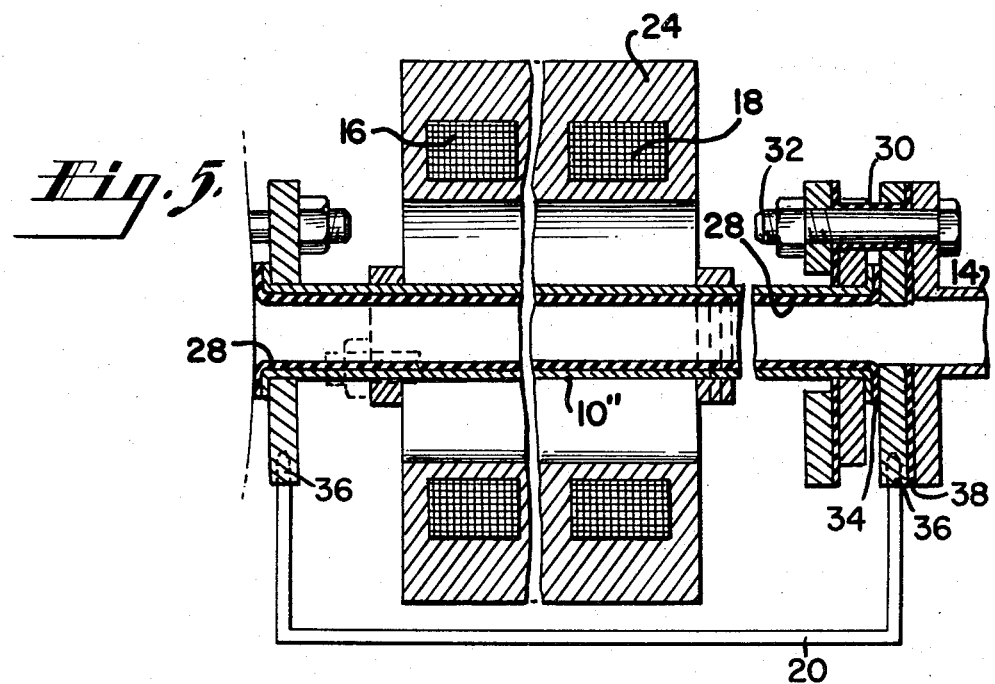
INVENTOR
RICHARD J. KIDDER
BY Charles H. Brown
Attorney United States Patent Office 3,404,335
Patented Oct. 1, 1968

3,404,335
APPARATUS FOR MEASURING ELECTRICAL
CONDUCTIVITY OF A CONDUCTING MEDI-
UM CAPABLE OF FLOWING IN A CONDUIT
Richard J. Kidder, Great Notch, N.J., assignor, by mesne
assignments, to Beckman Instruments, Inc., Fullerton,
Calif., a corporation of California
Filed July 26, 1965, Ser. No. 474,655
4 Claims. (Cl. 324—30)

ABSTRACT OF THE DISCLOSURE

Apparatus for measuring the electrical conductivity of an electrically conducting medium which is present in a conduit and through which the medium may flow. Means are provided externally of the conduit for inducing the flow of alternating current in the medium within the conduit, and additional means are provided externally of the conduit for measuring said current.

This invention relates to a method of and apparatus for measuring the electrical conductivity of a conducting medium which is capable of flowing, such as an electrolyte solution, slurries, sludges, and the like.

It is known to measure the conductivity of an electrolyte by means of a pair of toroidal cores immersed in a solution. Certain problems involving stray leakage arise when the cores are physically immersed in the solution. In the past it has been known to employ two spaced electrodes immersed in the solution for measuring conductivity, but such an arrangement suffers from further disadvantages including the polarization of the electrodes while in use. United States Patent No. 2,542,057, granted Feb. 20, 1951, to M. J. Relis, proposes to overcome the foregoing difficulties by the use of means in the pick-up circuit for compensating for the inductive effect of the stray field from the current setting up means.

An additional problem present in heretofore known systems involves errors in the measurement of electrical conductivity due to changes in temperature of the conducting medium. Since electrical conductivity varies markedly with the temperature of the conducting material (differently for different mediums), a measurement of electrical conductivity has little significance unless it is related to a specific temperature. Instruments without means of temperature compensation are of limited value.

The present invention is a simplified, relatively inexpensive and improved electrodeless system for measuring the electrical conductivity of a conducting medium and which eliminates the need for immersing the toroidal cores or electrodes within the electrolyte or solution under investigation. Further, the present invention makes use of a system of minimum components and wiring complexity to achieve a highly efficient and accurate measurement of the electrical conductivity of the conducting medium being tested. Still further, the present invention corrects the measurements of electrical conductivity (for the effects of temperature) to a standard reference temperature so that the differences in these corrected conductivity measurements may be used as indices of changes in the material other than temperature.

According to one aspect of the present invention, the conducting medium is confined within and flows through a straight hollow enclosed conduit, such as a hose or pipe which passes through a pair of toroidally wound coils. The conduit is provided with hollow metallic terminal fittings maintained at the same reference potential. In this manner, the toroidal coils which surround a section of the conduit are not immersed within the solution or electrolyte whose conductivity is to be measured. The temperaure of the conducting medium or material is preferably sensed with a temperature-sensitive resistive element and the resistance changes of the element are used to correct the measured electrical conductivity of the medium or material to some reference temperature.

Brief description of drawings

A detailed description of the invention follows in conjunction with drawings, wherein:

FIG. 1 illustrates one embodiment of the invention;

FIGS. 1a, 1b and 1c show different resistive networks which can be used with the temperature sensing element for obtaining a modification of the effective temperature coefficient thereof;

FIG. 2 is a schematic diagram showing the equivalent electrical circuit of the embodiment of FIG. 1 in a complete electrical system with the temperature-sensitive element and a vacuum tube voltmeter suitably connected therein;

FIG. 3 shows the embodiment of FIG. 1 provided with an insulated hose for confining and carrying the solution whose conductivity is to be measured, and an epoxy casing or housing for mounting and supporting the toroidal cores therein. The dimensions illustrated are by way of example only;

FIG. 4 shows the epoxy casing or housing of FIG. 3, partly broken away to illustrate how the toroidal cores may be mounted within the housing; and FIG. 5 essentially shows the embodiment of FIG. 1 provided with an insulation-lined steel pipe conduit for carrying the solution whose conductivity is to be measured.

Throughout the drawings the same parts are identified by the same reference numerals, while equivalent parts are provided with prime designations.

Detailed description

The apparatus for measuring the electrical conductivity illustrated in FIG. 1 includes a hollow conduit 10 whose opposite ends are fastened to and communicate with hollow metallic electrically conductive terminal pipes 12 and 14. The conduit 10 may be a sturdy hose made of insulating material, such as Teflon-lined or rubber-lined hose 10′ as shown in FIG. 3, or a steel pipe 10″ covered or lined on its interior with electrical insulation material as shown in FIG. 5. The conduit 10 may be nonmagnetic and nonconductive.

Surrounding a section of the conduit 10 there are provided coaxially arranged and suitably spaced driver and pick-up toroidal coils 16 and 18, respectively. These toroidal coils surround cores containing a good quality magnetic material, preferably of high permeability upon which coils are wound. The cores may or may not be identical in construction. Driver coil 16 is excited by current from a highly stable alternating current source OSC which supplies currents of stable frequency and amplitude. By way of example only, a Hartley oscillator and amplifier may be used which supplies to the driver toroidal coil 16 a frequency in the range of 2,000 to 18,000 c.p.s. and of a voltage around 10 volts and less, but preferably not exceeding 15 volts.

A direct wire connection 20, preferably covered with insulation, connects both grounded metal terminal pipes or fittings 12 and 14 together, as shown in FIG. 3. If terminal pipes 12 and 14 are grounded and at the same potential, then wire connection 20 need not be used. The grounding or connection 20 between metallic terminal fittings or pipes is necessary to complete the electrical loop. A vacuum tube voltmeter 22 is coupled to the pick-up toroidal coil 18. A temperature-sensitive resistive element T is positioned externally to conduit 10 so as to have the same temperature as the sample electrolyte solution or slurry flowing through the conduit. This element T may be a thermistor embedded in glass and electrically connected to a resistor network so as to make the temperature coefficient of resistance equal to the temperature coefficient of resistance of the material or solution present in the conduit 10. Two such resistive networks are shown in FIGS. 1a and 1b as constituting, with T, two-terminal devices. The resistive networks of FIGS. 1a and 1b provide overall coefficients lower than the coefficients of the active element T. The network of FIG. 1b is capable of giving a better match of coefficient over a shorter temperature span than that of FIG. 1a. FIG. 1c discloses two active temperature sensing elements T coupled together in bridge circuits so as to provide an overall coefficient several times greater than the coefficients of these active elements. The resistive network may be located physically within the transmitter, and it together with the active temperature sensing element may serve as a gain control of the oscillator signal sent to a buffer amplifier before being applied to the input toroid. An example of how the resistance network of FIG. 1a is coupled to the oscillator or the vacuum tube voltmeter is shown in FIG. 1, in a manner similar to the showing of FIG. 1c.

The operation of the apparatus may be better understood by reference to the circuit diagram of FIG. 2. The material flowing through conduit 10 may be viewed as a single turn coupled to the oscillator OSC and the vacuum tube voltmeter 22 by transformer coupling through the toroidal coils 16 and 18, respectively. Put another way, the driver toroidal coil may be considered as a primary winding of transformer whose secondary winding is the closed loop, while the pick-up toroidal coil is the secondary winding of another transformer whose primary is the closed loop. The alternating current supplied to the driver coil sets up an electrical current $i$ in the material under investigation which flows through the conduit 10 and through ground in the direction of the arrows. This alternating current $i$ sets up an alternating field in the pick-up toroid 18 which causes a voltage to be generated therein in proportion to the conductivity of the electrolyte. The magnitude of the voltage generated in toroid 18 is detected in the high impedance input, highly degenerated vacuum tube voltmeter 22. If desired, the vacuum tube voltmeter may be replaced by a transducer which converts the picked-up A.C. signal to a D.C. signal proportional to the input A.C., after which the D.C. signal is fed to a large indicating meter with a scale, or to any suitable recorder. By placing a small resistor in series with the meter, a millivolt signal is provided for feeding a remote potentiometer recorder, not shown, when desired. Alarm and other control features may be incorporated in the system. The temperature sensitive element T which is immersed in the material and in thermal contact therewith may be connected, as shown, across the output of the oscillator or, alternatively, as shown by the dotted lines across the input of the vacuum tube voltmeter for automatic temperature compensation. The magnitude of the electrical current $i$ is directly proportional to the electrical conductivity of the material within the conduit 10. If the temperature of the material changes from the standard temperature, the electrical conductivity will change, and current $i$ will change. However, since T is in thermal contact with the solution or material, its temperature and resistance will change in the proper direction to correct the measurement.

In practice, the low impedance toroids may be matched to the impedances of the circuit components coupled thereto. For this purpose, the oscillator OSC may be coupled to driver core 16 through a cathode coupler or a suitable impedance matching transformer, and the output of the pick-up coil coupled through an impedance matching transformer to the vacuum tube voltmeter 22. Such impedance matching also permits the use of long cables to the driver and pick-up coils.

FIG. 3 shows the embodiment of FIG. 1 with the toroidal coils potted or encapsulated within a machined epoxy block housing or casing 24, in a manner shown more clearly in FIG. 4. The conduit 10 in FIG. 3 is a Teflon-lined rubber hose suitable for relatively low pressure flow systems. It should be noted in FIG. 4 that the two toroidal coils are relatively closely spaced from one another. They are separated by O rings, not shown. A rubber filler 26 separates the cores from the epoxy block 24.

FIG. 5 shows the embodiment of FIG. 1 using a steel pipe 10'' for the conduit through which flows the material whose conductivity is to be measured. The steel pipe conduit 10'' is insulated from the end terminal pipes by an electrical insulation on the interior of the conduit as by a Teflon-lined or rubber covering 28, and also by an insulator sleeve 30 surrounding a metallic bolt 32 and which prevents the passage of currents from pipe 10'' to metallic terminal pipe 14. The insulation covering 28 is turned at a right angle to the pipe 10'' at end 34 to prevent direct metallic contact between pipe 10'' and the terminal fitting or pipe. An insulation gasket 38 is also provided as shown. Such a construction employing a steel pipe is useful for high pressure and high temperature flow systems. FIG. 5 is similar to FIGS. 1 and 3 in that the metallic terminal pipes are grounded and, in effect, connected together so as to be at the same reference potential. This arrangement, together with the electrically conducting solution within the conduit, forms an electrically closed loop. The strap 20, as in FIG. 3 (threaded into the terminal pipes as shown by the dotted lines outlines designated 36), is connected between the terminal pipes.

The invention as herein described provides a simplified, efficient, accurate and inexpensive method involving an electrodeless apparatus for measuring the electrical conductivity of solutions containing an electrolyte and mixtures of liquids and solids.

The term "solution" used in the specification and appended claims is deemed to include any liquid, sludge, slurry, mud, oil and mixtures thereof with or without solids and which can be made to flow through a conduit.

I claim:

1. Apparatus for measuring the conductivity of a solution, comprising a conduit through which said solution is adapted to flow, a toroidal coil surrounding a region of said conduit for setting up an alternating current in the solution within said conduit, and another toroidal coil spaced from said first coil and surrounding another region of said conduit and responsive to said current for setting up an alternative current voltage, and a measuring device coupled to and responsive to the voltage set up in said other coil for enabling an indication of the conductivity of said solution to be made, said conduit being a metallic pipe, terminal metallic fittings connected to and in fluid communication with said conduit, means for insulating said metallic conduit from said terminal metallic fittings, and means for grounding said terminal fittings at the same reference potential.

2. Apparatus for measuring the conductivity of a solution, comprising a conduit through which said solution is adapted to flow, said conduit having inlet and outlet ends, a toroidal coil surrounding a region of said conduit for setting up an alternating current in the solution within said conduit, a stable alternating current oscillator supplying a voltage of less than 15 volts and of a frequency below 18,000 cycles per second to said toroidal coil, and another toroidal coil spaced from said first coil and surrounding another region of said conduit and responsive to said current for setting up an alternating current voltage, and a measuring device coupled to and responsive to the voltage set up in said other coil for enabling an indication of the conductivity of said solution to be made, metallic terminal fittings connected to the ends of said conduit and in fluid communication therewith, and means for connecting said metallic terminal fittings together so that they have the same reference potential and means including a temperature sensitive resistor external of said conduit and having the same temperature as a sample of said solution and coupled to one of said coils for compensating for a change in temperature of said solution in the measurement of the conductivity thereof.

3. Apparatus in accordance with claim 1, wherein said conduit and insulating means comprise a metallic pipe, the interior of which is lined with insulation.

4. Apparatus for measuring the conductivity of a solution, comprising a metal conduit the interior of which is lined with insulation through which said solution is adapted to flow, said conduit having inlet and outlet ends, a toroidal coil surrounding a region of said conduit for setting up an alternating current in the solution within said conduit, a stable alternating current oscillator supplying a voltage to said toroidal coil, and another toroidal coil spaced from said first coil and surrounding another region of said conduit and responsive to said current for setting up an alternating current voltage, and a measuring device coupled to and responsive to the voltage set up in said other coil for enabling an indication of the conductivity of said solution to be made, metallic terminal fittings connected to the ends of said conduit and in fluid communication therewith, and means for connecting said metallic terminal fittings together so that they have the same reference potential, insulation means preventing metal-to-metal contact between said metal conduit and said metal terminal fittings, and means including a temperature sensitive resistor external of said conduit and having the same temperature as a sample of said solution and coupled to one of said coils for compensating for a change in temperature of said solution in the measurement of the conductivity thereof.

References Cited

UNITED STATES PATENTS

| 2,542,057 | 2/1951 | Relis | 324—30 |
| 2,709,785 | 5/1955 | Fielden. | |
| 3,078,412 | 2/1963 | Blake | 324—30 X |
| 3,151,293 | 9/1964 | Blake et al. | 324—30 |

FOREIGN PATENTS

| 831,692 | 3/1960 | Great Britain. |

RUDOLPH V. ROLINEC, *Primary Examiner.*

C. F. ROBERTS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,335   October 1, 1968

Richard J. Kidder

It is certified that error appears in the above identified patent and that said Letters Patent are hereby corrected as shown below:

Column 4, line 49, "alternative" should read -- alternating --.

Signed and sealed this 17th day of February 1970.

(SEAL)
Attest:

Edward M. Fletcher, Jr.   WILLIAM E. SCHUYLER, JR.
Attesting Officer          Commissioner of Patents